(12) United States Patent
Terauchi et al.

(10) Patent No.: US 6,754,012 B2
(45) Date of Patent: Jun. 22, 2004

(54) SYNTHETIC RESIN-MADE CONCAVE CONE LENS FOR IRRADIATION OF STANDARD LASER LINE

(75) Inventors: Isshu Terauchi, Nara-ken (JP); Norihisa Teraji, Tokyo (JP)

(73) Assignee: Nissho Corporation, Higashi-Osaka (JP)

( * ) Notice: Subject to any disclaimer, the term of this patent is extended or adjusted under 35 U.S.C. 154(b) by 67 days.

(21) Appl. No.: 10/246,771

(22) Filed: Sep. 19, 2002

(65) Prior Publication Data

US 2003/0067690 A1 Apr. 10, 2003

(30) Foreign Application Priority Data

Sep. 20, 2001 (JP) .................................... 2001-286242

(51) Int. Cl.[7] .......................... G02B 17/00; G02B 13/18
(52) U.S. Cl. ..................... 359/726; 359/709; 359/728
(58) Field of Search ............................... 359/726, 708, 359/728

(56) References Cited

U.S. PATENT DOCUMENTS 5,253,312 A * 10/1993 Payne et al. .................. 385/31
5,343,330 A * 8/1994 Hoffman et al. ............ 359/708

* cited by examiner

Primary Examiner—Scott J. Sugarman
(74) Attorney, Agent, or Firm—Westerman, Hattori, Daniels & Adrian, LLP

(57) ABSTRACT

The invention is to provide a synthetic resin-made concave cone lens for radiating a standard laser line in a low cost in that accuracy of irradiation of a standard laser line can be assured, occurrence of defective products can be prevented, and advantages in production cost owing to mass production can be sufficiently enjoyed.

2 Claims, 2 Drawing Sheets

SYNTHETIC RESIN-MADE CONCAVE CONE LENS FOR IRRADIATION OF STANDARD LASER LINE

BACKGROUND OF THE INVENTION

1. Field of the Invention

The present invention relates to an improvement of a synthetic resin-made concave cone lens for irradiation of a standard laser line used as being installed in an irradiation function part of a marking laser device that irradiates a standard line in a horizontal direction or a vertical direction and that is used mainly in the case where horizontal accuracy or vertical accuracy of a structure or a building is set or confirmed in a construction field, or in the case where horizontality of a ceiling or a floor or layout or a partition of room is set.

2. Description of Related Art

A synthetic resin-made concave cone lens has been known as a reflector (hereinafter, a term "concave cone lens" will be used as a synonym of "reflector") described in JP-A-2000-18946, which has been filed by the present applicant.

The known concave cone lens filed this applicant is mainly installed in an irradiation function part of a marking laser device. The concave cone lens is developed as a substitute of a so-called cone lens formed convexly or a truncated cone lens in the shape of a frustum of a right cone, which have been known prior to the filing of this application. It is also developed to provide an optimum product in standpoints of accuracy, production and cost as parts of an irradiation mechanism of a marking laser device using a semiconductor laser as a light source, which has been known from JP-A-4-22943U.

The publicly known art prior to this application has three problems as described in JP-A-2000-18946. The first problem is that, in the cone lens and the truncated cone lens, it has been impossible to reduce production costs by mass production because high production accuracy and high surface accuracy are demanded, owing to the structure, when producing the lenses to reflect the laser beam to circumference using a cone surface, with metal-vapor-deposition by focusing the laser beam on the apex of the cone, as a reflective surface (8).

Secondly, because the marking laser device described in JP-A-4-22943U comprises a helium gas laser tube which is supported in a vertical direction automatically by a gyroscopic stabilizer and disposed in a windscreen arranged vertically in a head and on said windscreen plural threaded type fixing members are provided to fix the protective tube of the laser tube, an unexpected movement of the laser tube can be prevented, but it is extremely troublesome to rotate and operate the plural fixing members respectively, separately from connection with a power source.

Thirdly, because a supporting body is free, which supports a laser irradiation device and which is movably hold like a plumb bob, the laser irradiation device collides with an inner wall of a cover or with a brace, during transportation of the device, conveyance to a construction field and movement in the construction field, and the damage of said inner wall or said brace and the damage of movably hold part incur inaccuracy on irradiation of a vertical or horizontal marking level line.

The invention disclosed in JP-A-2000-18946 applied by this applicant is to solve the foregoing problems. As described in the claims and the detailed description of the invention, a glass material, a polycarbonate resin and a polystyrene resin are used as a translucent member. In the case of the grass material a convex cone lens is produced by press metal molding and in the case of an acrylic resin and the polycarbonate resin it is produced by injection molding means using a metal mold comprising a parting line of a split mold which fits an opening surface of a cone concave part and a gate which is one part of a circumferential surface having no influence upon reflection. On one end surface of a solid cylindrical body formed with the above-mentioned translucent member, the concave cone lens forms the cone concave part, an apex angle of which is accurate within 90°±20" and a top part of which accords with a center line of the solid cylindrical body, and on the inner surface of said cone concave part a reflective film is formed by vapor-deposition or other means, in order to reflect a lay of light, incident from the other end surface on and through said center line, into all directions perpendicular to the center line, using an interface between the reflective film and the inner surface of the cone concave part as the reflective surface.

In the case where the apex angle of the concave cone lens is 90° or within the high accuracy limit of 90°±20" such as the invention disclosed in JP-A-2000-18946 concerning the improvement of the above-mentioned, when the material is the glass material, and when the material is the thermoplastic member, but the reflective extent of a laser beam is relatively narrow as a standard line for a partition of room, it is advantageous in such a way that it produces an extremely small error, it can be mass-produced, the production cost is low, it is excellent in practical use, and it can be used in various kinds of laser irradiation devices including a marking laser device. However, when the concave cone lens is formed with the thermoplastic materials, such a problem has been found that accuracy of the standard laser line irradiation cannot be assured, defective products occur, and reduction in production cost by mass production cannot be fully enjoyed.

As a result of consideration of various factors on causes of the forgoing situation, the following primary causes have been found. A small size of about 10 mm both on the diameter and the length of a concave cone lens, used in various laser irradiation devices including the marking laser device, makes a slant angle (taper) for releasing from the mold upon injection molding remarkably small, therefore it was judged possible that the apex angle of the concave cone lens is covered within the limits of 90° (±20"), just same as when it is produced using the glass material as a material, therefore, much importance has not been attached to a difference in refractive index between the glass material and the thermoplastic synthetic resins. Further, because the slant angle for releasing from the mold is extremely small, there are some cases that the taper surface, which is to be a reflective surface, is damaged upon releasing from the mold to fail to obtain the demanded high surface accuracy.

Furthermore, the production of a metal mold assuring the extremely small releasing slant angle for obtaining the high accuracy of an apex angle of a concave cone lens of 90° (±20") or higher accuracy causes considerable increase of the production cost of the metal mold and also demands a careful manipulation upon releasing from the mold in the injection molding operation. Therefore, it is also a problem that effects of mass production and reduction in cost owing to the mass production cannot be reflected to the production of the concave cone lens.

The invention is to provide such a synthetic resin-made concave cone lens for irradiation of a standard laser line in a low cost that solves the unsolved problems found in the invention described in JP-A-2000-18946 relating to the foregoing improvements, whereby even when the concave cone lens is formed with a thermoplastic member, accuracy of irradiation of a standard laser line can be assured, occurrence of defective products can be prevented, and advantages in production cost owing to mass production can be sufficiently enjoyed.

SUMMARY OF THE INVENTION

The invention relates to a synthetic resin-made concave cone lens for radiating a standard laser line comprising a concave cone lens main body (1) produced with a thermoplastic synthetic resin by injection molding means having translucency and an arbitrary refractive index, and a reflective film (9) formed on a particular surface thereof, so as to make a interface between the reflective film (9) and the concave cone lens main body (1) as a reflective surface (8), the concave cone lens main body (1) having a cone concave part (3) on one end on a center axis line (4) of the base body having a cylindrical form, the cone concave part (3) having an apex angle that agrees with an angle, with which a laser beam incident in parallel to the center axis line (4) is emitted in a direction perpendicular to the center axis line (4), the angle being obtained from the refractive index and a releasing angle that is larger than an ordinary releasing slant, both of which are already known an apex of the apex angle and a cone center line passing the apex agree with the center axis line (4) of the base body, and an opening surface being formed as on the side of an end surface of the one end.

A parting line is arranged on the apex of the cone concave part (3), on an outer circumference of an outer wall part on a side of an incident end surface (5) or on an opening side of the cone concave part (3), an irradiation part (6) is formed to have a taper injection circumference surface with a releasing angle that is larger than an ordinary releasing slant angle, an incident end surface (5) perpendicular to the center axis line (4) is formed on an end surface of the other end part of the base body, and the incident end surface (5), an inner surface of the cone concave part (3) and a circumference surface of the irradiation part (6) are formed to be mirror surfaces.

Furthermore, the reflective film (9) is formed with the inner surface of the cone concave part (3) of the concave cone lens main body (1) as a particular surface, with a contact interface between the reflective film (9) and the concave cone lens main body (1) being the reflective surface (8), whereby a laser beam, which is emitted from a semiconductor laser light source (21) that agrees with or is parallel to the center axis line (4) of the concave cone lens main body (1), through the incident end surface (5) of the base body and reflected by the reflective surface (8), is radiated from an irradiation part (6) of the concave cone lens main body (1) to a direction perpendicular to the center axis line (4) of the concave cone lens main body (1), so as to radiate and indicate a laser line on an article to be radiated.

In the synthetic resin-made concave cone lens for radiating a standard laser line having the foregoing constitution according to the invention, a concave cone lens main body (1) is produced with a thermoplastic synthetic resin by injection molding means having translucency and an arbitrary refractive index, and a reflective film (9) is formed on a particular surface thereof, so as to make a contact interface between the reflective film (9) and the concave cone lens main body (1) as a reflective surface (8).

The apex angle of the cone concave part (3) of said concave cone lens main body (1) is set and formed to radiate the laser beam incident in parallel to the center axis line (4) in a direction perpendicular to the center axis line (4) by the refractive index of the used thermoplastic resin and the releasing angle, which is larger than the ordinary releasing slant angle, an irradiation part (6) having a taper injection circumference surface is formed by arranging a parting line on an outer circumference of an outer wall part of the apex of the cone concave part (3) or on an opening side of the cone concave part (3) and by using a releasing angle larger than the ordinary releasing slant angle, an incident end surface (5) perpendicular to the center axis line (4) is formed on an end surface of the other end part of the base body, and the incident end surface (5), an inner surface of the cone concave part (3) and a circumference surface of the irradiation part (6) are formed to be mirror surfaces. Therefore, the unsolved problems found in the invention described in JP-A-2000-18946 relating to the improvements are removed, and even in the case where the concave cone lens is formed with the thermoplastic member, accuracy of irradiation of a standard laser line can be assured, such a synthetic resin made concave cone lens can be provided at a low cost that occurrence of defective products can be prevented, and advantages in production cost owing to mass production can be sufficiently enjoyed.

More specifically, the apex angle of the cone concave part (3) of the concave cone lens main body (1) can be determined by the known refractive index of the thermoplastic synthetic resin material used as a material of the concave cone lens main body (1) and by the releasing angle larger than an ordinary releasing slant, a release of the concave cone lens main body (1) from the mold can be carried out without any particularly careful operation and without damaging the irradiation part (6) prevented from damaging, accuracy of the irradiation direction of the laser beam can be assured with maintaining the surface accuracy, and production of the concave cone lens main body (1) can be carried out efficiently.

Because the apex angle of the cone concave part (3) of the concave cone lens main body (1), which is determinded and molded in a foregoing manner, is set on the basis of the refractive index of the member used, the laser beam incident in parallel to the center axis line (4) can be radiated from the irradiation part (6) formed in a taper form with a surface accuracy maintained in a direction perpendicular to the center axis line (4) that is closest to 90° in an accurate manner within an extremely high accuracy range (90°±30") with an extremely small accuracy error.

Furthermore, the mold of the concave cone lens main body (1) has a releasing angle that is larger than the ordinary releasing slant angle, and the apex angle of the cone concave part (3) of the concave cone lens main body (1) is determined by the relationship between the releasing angle and the refractive index. Therefore, a mold having extremely high machining accuracy can be produced at a relatively low cost.

As similar to the invention of the foregoing publication made by the inventors, even when the reflective film (9) formed with aluminum by vapor-deposition on the inner surface of the cone concave part (3) is uneven in thickness, a reflective surface (8) having higher accuracy (i.e., a ratio of reflection strength of from 25 to 80 (Re: 0.05 to 0.8 $\mu$m)) can be easily formed by increasing the accuracy of the inner surface of the cone concave part (3) irrespective of the unevenness of the thickness, whereby linearity of an accurate standard laser line by irradiation of a laser beam can be maintained.

Whether the position of the parting line is on the outer circumference of the outer wall of the apex of the cone concave part (3) or on the opening side of the cone concave part (3), the concave cone lens can be produced, and thus the above has been described selectively. Particularly, in the case where concave cone lens main body (1) has a cylindrical shape (i.e., a supporting flange part (2) and a positioning projection are not provided), as apparent from FIG. 4, a laser beam emitted from a semiconductor laser light source (21) attached to a aluminum-made head main body (20) of an almost prism shape having a retention hole (20a) penetrating the center thereof is incident on a condensing lens system (23) and on a reflective surface (8) of a thermoplastic synthetic resin made concave cone lens (M) arranged at a tip end of a mirror retention cylinder (24) equipped on a laser irradiation device, whereby the object of the invention can be attained even though the direction of the sharp end of the taper of the circumference of the irradiation part (6) is in either the opening side of the cone concave part (3) or the side of the holding and fixing part.

DETAILED DESCRIPTION OF THE PREFERRED EMBODIMENTS

Figure 1:
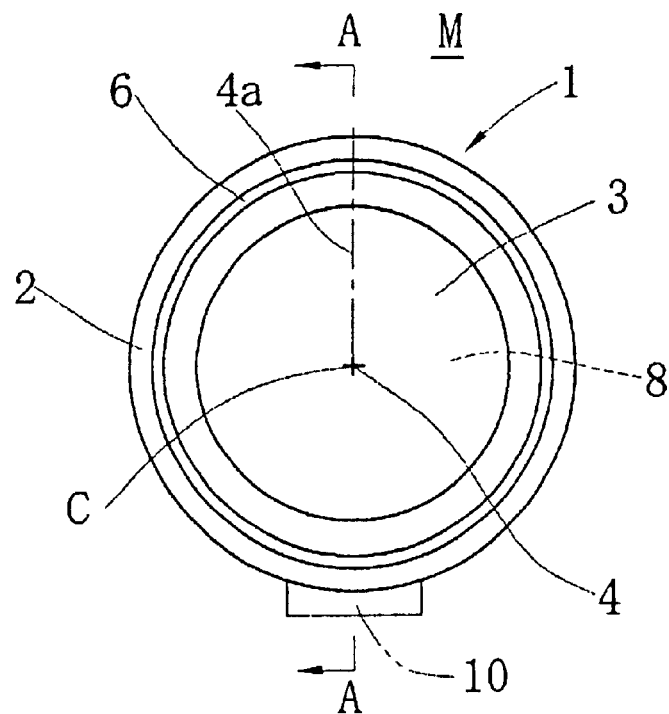
FIG. 1 is an enlarged elevational view showing a concave cone lens (M) of an example according to the invention.
Figure 2:
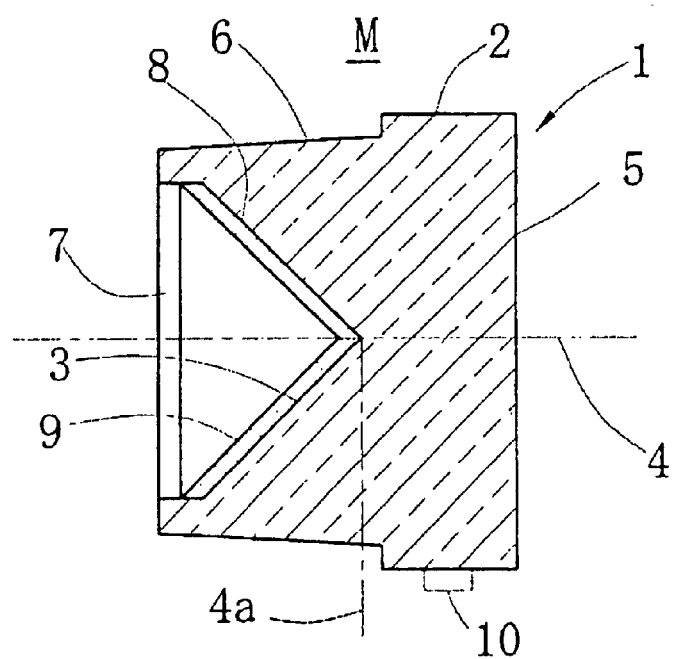
FIG. 2 is a cross sectional view on line A—A in FIG. 1.
Figure 3:
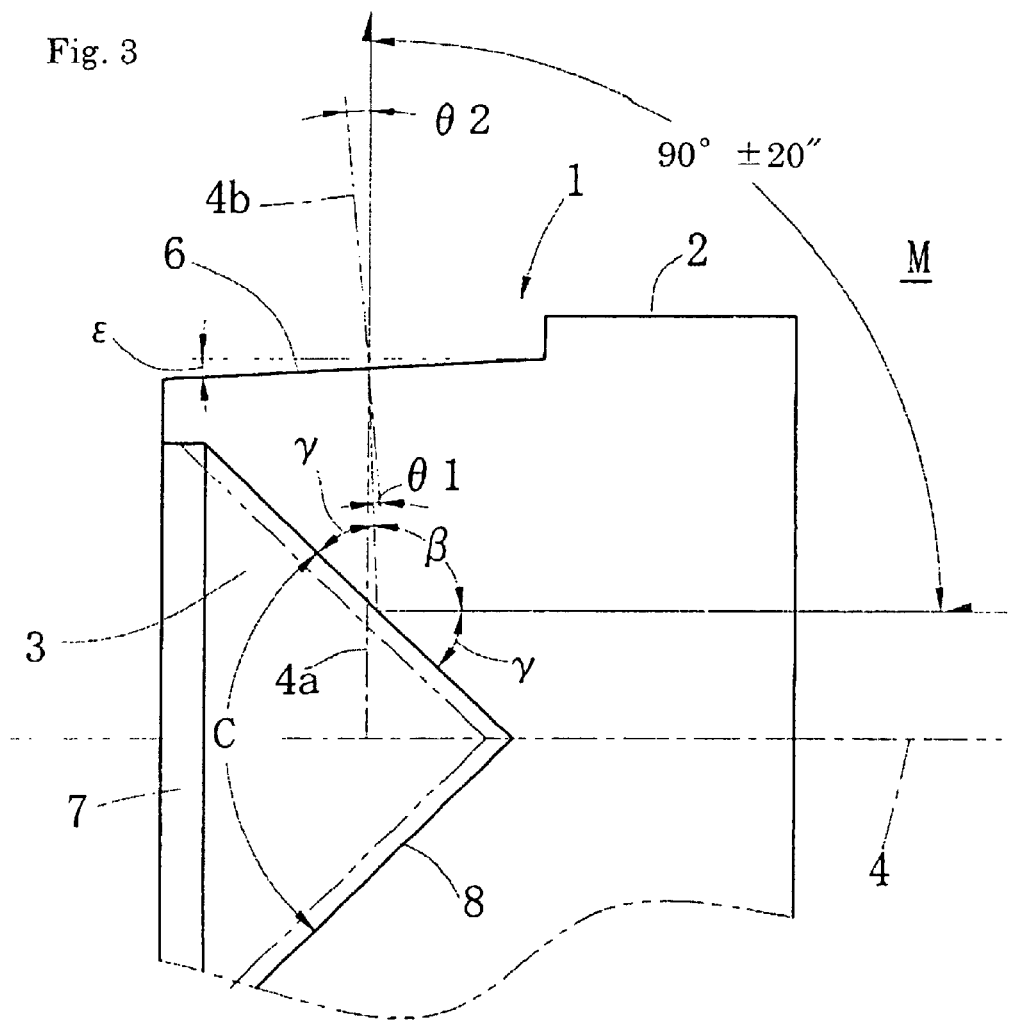
FIG. 3 is a partial explanatory view showing the relationship among incidence, reflection and irradiation of a laser beam.

An example of a synthetic resin-made concave cone lens according to the invention will be described. FIG. 1 is an enlarged elevational view showing a concave cone lens (M), FIG. 2 is a cross sectional view on line A—A in FIG. 1, and FIG. 3 is an explanatory view showing the relationship among incidence, reflection and irradiation of a laser beam. The concave cone lens main body (1), formed with an amorphous polyolefin resin (Zeonex, a registered trademark of Zeon Corp.) which is excellent in light transmittance as a translucent member and which has a refractive index N of 1.5279 and formed by injection molding means, has a diameter of 10 mm (machining accuracy: +0, −0.02) and a thickness of 3 mm. The concave cone lens main body (1) comprises a supporting flange part (2) provided with a gate part (10), which may be removed when it obstructs the supporting operation or may remain for omitting unnecessary operation when it does not obstruct the supporting operation, and an incident end surface (5) formed to have the same center axis line (4) as that of the supporting flange part (2), on the opposite side to said incident end surface (5) but in the direction of the center axis line (4) an irradiation part (6) which is mould as integral molding having a length of 5 mm, a diameter of 9 mm at the bottom on the side of the supporting flange part (2) (machining accuracy: +0, −0.02) and a taper shape of releasing angle ϵ of 3° (i.e. a taper angle of 6°), in the center on the narrow side of the taper of said irradiation part (6) the cone concave part (3) which is formed as continuous to a cap hole (7) having a depth of 0.5 mm and has a depth of 3.56 mm and an apex angle of C degree. The inner surface of the cone concave part (3), the circumference of the irradiation part (6) and the incident end surface (5) are formed to have a surface roughness of 0.05 μm or less.

A reflective film (9) is formed with aluminum by vapor-deposition on the inner surface of the cone concave part (3) of the concave cone lens main body (1), so as to form a reflective surface (8) having a ratio of reflection strength of from 25 to 80 (Re: 0.05 to 0.8 μm) at an interface between the reflective film (9) and the inner surface of the cone concave part (3). In the case where the tip end part of the concave cone lens main body (1) is detachably covered, a cap (26) is provided that is formed with a synthetic resin or a rubber member that does not damage the outer circumference of the concave cone lens (M), and has a cover-fixing part(7a) inserted into the cap hole (7) and a cap part (7b) covering the tip end of the outer circumference (see FIG. 4), whereby the reflective film (9) is protected to increase the durability.

In the case where the incident angle is 45° or less, total reflection occurs, and the reflective film (9) may not be provided, whereby the production cost can be further reduced.

For radiating a laser beam to the circumference of the irradiation part (6) in a perpendicular line (4a) at right angles to the center axis line (4) as an irradiation direction, in the case where the apex angle of the cone concave part (3) of the concave cone lens main body (1) is C, the refractive index N of the material used is 1.5279, the releasing angle ϵ is 3° the incident angle (reflective angle) with respect to the reflective surface (8) is γ degree, the angle between the reflecting direction line and the vertical line (4b) with respect to the circumference of the irradiation part (6) is θ1, the angle between the vertical line (4b) and the radiating direction is θ2, and the angle between the incident line and the reflective line is β, the concave cone lens (M) produced to have the foregoing configuration satisfies the following expressions:

| | |
|---|---|
| $N = \sin\theta_2/\sin\theta_1$ | $\sin\theta_1 = \sin\theta_2/N$ |
| $\beta = 90 + \theta_2 - \theta_1$ | $\gamma = (180 - \beta)/2$ |
| $\epsilon = \theta_2$ | |

When $C=180-\beta=2\gamma$, C is 88.96297°, and by processing the cone shape with high accuracy to have the apex angle of the cone concave part (3) of 88.96297°, the incident laser beam can be radiated accurately in the direction perpendicular to the center axis line (4) (with the accuracy range of 90°±20") so as to radiate a standard laser line.

The foregoing example has been described for the case where the amorphous polyolefin resin (Zeonex, a registered trademark of Zeon Corp.) being excellent in light transmittance and having a refractive index N of 1.5279 is used, but there are cases where heat-resistant transparent resin of a polycarbonate resin, a polystyrene resin, a methacrylic resin (Parapet, a registered trademark of Kuraray Co., Ltd.) and a high molecular weight cyclohexadiene homopolymer (Arton, a registered trademark of JSR Corp.) are used. In these cases, the concave cone lens is produced by the injection molding means or the compression molding means where the releasing angle of the irradiation part (6) ϵ is set at 3°, and the apex angle C of the cone concave part (3) is determined with the known refractive indexes C of the respective material.

The thermoplastic synthetic resin excellent in light transmittance as a translucent member and capable of being molded by the injection molding means or the compression molding means is used as a material of the synthetic resin-made concave cone lens, but even when the translucent member is replaced with a thermosetting resin excellent in light transmittance and capable of being molded by the compression molding means, the same effects as the thermoplastic synthetic resin can be obtained by producing the synthetic resin-made concave cone lens in consideration of the refractive index thereof.

The same effects as the synthetic resin-made concave cone lens (M) can be obtained when the concave cone lens (M) is produced by using a concave cone lens main body (1) formed with a glass material, but the production cost thereof is higher than the concave cone lens (M) formed with a thermoplastic synthetic resin, and it is liable to be broken. Therefore, it is preferred from the practical standpoint that a concave cone lens (M) formed with a synthetic resin is used.

The uses of the thermoplastic synthetic resin-made concave cone lens (M) are the same as those for the reflector described in JP-A-2000-18946made by the inventors. Therefore, only a brief description of a laser irradiation device equipped with the thermoplastic synthetic resin-made concave cone lens (M) will be made with reference to the schematic figure.

Figure 4:
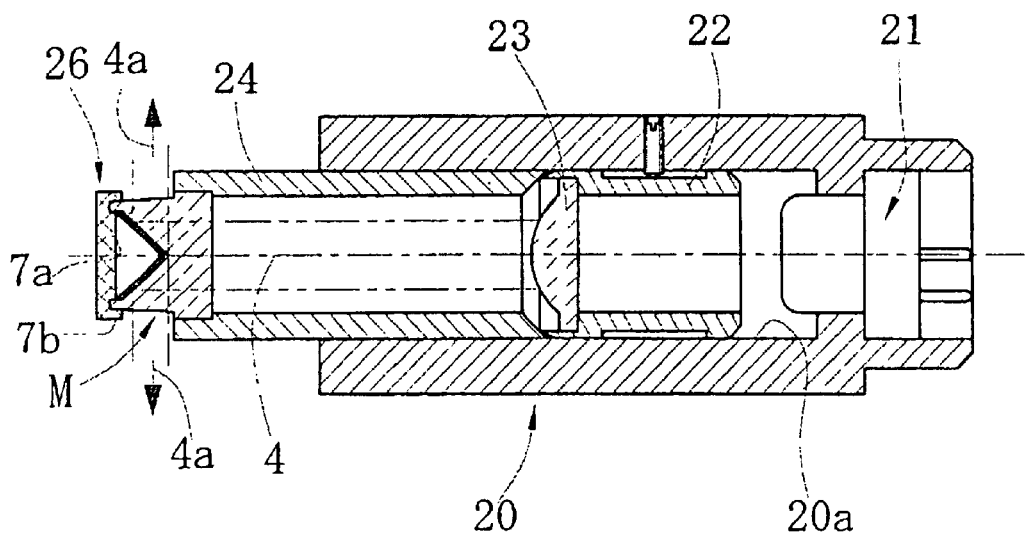
FIG. 4 is a schematic cross sectional view showing an assembly of a laser irradiation device using a concave cone lens (M) of an example according to the invention.

FIG. 4 is a schematic cross sectional view showing an assembly of an irradiation head of a laser irradiation device that is equipped on a table (not shown in the figure) that horizontally operates in the horizontal two directions, so as to radiate a standard line to the circumference in a vertical direction. The laser irradiation device is constituted with an aluminum-made head main body (20) having a retention hole (20a) penetrating at the center of an almost prism, a semiconductor laser light source (21) using a visible ray semiconductor laser of a wavelength of 635 nm attached to one end of the head main body (20), a lens retention cylinder (22) attached at an intermediate position of the head main body (20), a condensing lens system (23) supported thereby and having a function of condensing the laser beam emitted from the semiconductor laser light source (21) to make a parallel light ray, a mirror retention cylinder (24) attached to the other end of the head main body (20), a thermoplastic synthetic resin-made concave cone lens (M) attached and retained at the tip end of the mirror retention cylinder (24), and a cap (26).

What is claimed is:

1. A synthetic resin-made concave cone lens for radiating a standard laser line comprising a concave cone lens main body (1) produced with a thermoplastic synthetic resin material by injection molding means having translucency and an arbitrary refractive index, and a reflective film (9) formed on a particular surface thereof, so as to make an interface between the reflective film (9) and the concave cone lens main body (1) as a reflective surface (8), the concave cone lens main body (1) having a cone concave part (3) on one end on a center axis line (4) of the base body having a cylindrical form, the cone concave part (3) having an apex angle that agrees with an angle, with which a laser beam incident in parallel to the center axis line (4) is emitted in a direction perpendicular to the center axis line (4), the angle being obtained from the known refractive index and a releasing angle from a mold that is larger than an ordinary releasing slant angle, an apex of the apex angle and a cone center line passing the apex agree with the center axis line (4) of the base body, and an opening surface being formed on the side of an end surface of the one end, a parting line being arranged on an outer circumference of an outer wall part of the apex of the cone concave part (3) or on an opening side of the cone concave part (3), an irradiation part (6) being formed to have a taper injection circumference surface with an releasing slant angle that is larger than an ordinary releasing angle, an incident end surface (5) perpendicular to the center axis line (4) being formed on an end surface of the other end part of the base body, and the incident end surface (5), an inner surface of the cone concave part (3) and a circumference surface of the irradiation part (6) being formed to be mirror surfaces, the reflective film (9) being formed with the inner surface of the cone concave part (3) of the concave cone lens main body (1) as a particular surface with a contact interface between the reflective film (9) and the concave cone lens main body (1) being the reflective surface (8), whereby a laser beam, which is emitted from a semiconductor laser light source (21) that agrees with or is parallel to the center axis line (4) of the concave cone lens main body (1), through the incident end surface (5) of the base body and reflected by the reflective surface (8), is radiated from a circumference surface of an irradiation part (6) of the concave cone lens main body (1) to a direction perpendicular to the center axis line (4) of the concave cone lens main body (1), so as to radiate and indicate a laser line on an article to be radiated.

2. A synthetic resin-made concave cone lens for radiating a standard laser line as claimed in claim 1, wherein the thermoplastic synthetic resin member is one of resin heat resistant transparent resin of an acrylic resin, a polystyrene resin, a polycarbonate resin, an amorphous polyolefin resin, a methacrylic resin and a high molecular weight cyclohexadiene homopolymer.

* * * * *